US012803091B2

(12) United States Patent
Xu

(10) Patent No.: US 12,803,091 B2
(45) Date of Patent: Nov. 17, 2026

(54) END CAP ASSEMBLY, BATTERY CELL, BATTERY, AND POWER CONSUMING DEVICE

(71) Applicant: CONTEMPORARY AMPEREX TECHNOLOGY (HONG KONG) LIMITED, Hong Kong (CN)

(72) Inventor: Hu Xu, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 632 days.

(21) Appl. No.: 18/234,385

(22) Filed: Aug. 16, 2023

(65) Prior Publication Data

US 2024/0006695 A1 Jan. 4, 2024

Related U.S. Application Data

(63) Continuation of application No. PCT/CN2022/073581, filed on Jan. 24, 2022.

(30) Foreign Application Priority Data

Oct. 29, 2021 (CN) ......................... 202122633976.0

(51) Int. Cl.
*H01M 50/188* (2021.01)
*H01M 50/107* (2021.01)
(Continued)

(52) U.S. Cl.
CPC ....... *H01M 50/188* (2021.01); *H01M 50/107* (2021.01); *H01M 50/152* (2021.01); *H01M 50/179* (2021.01); *H01M 50/559* (2021.01)

(58) Field of Classification Search
None
See application file for complete search history.

(56) References Cited

U.S. PATENT DOCUMENTS

2012/0148884 A1 6/2012 Kim
2012/0282502 A1* 11/2012 Kim .................. H01M 10/0413 429/211

FOREIGN PATENT DOCUMENTS

CN 106784450 A 5/2017
CN 209133596 U 7/2019
(Continued)

OTHER PUBLICATIONS

International Search Report and Written Opinion mailed on Jul. 27, 2022, received for PCT Application PCT/CN2022/073581, filed on Jan. 24, 2022, 9 pages including English Translation.
(Continued)

*Primary Examiner* — Wyatt P Mcconnell
(74) *Attorney, Agent, or Firm* — XSENSUS LLP

(57) ABSTRACT

An end cap assembly may include an end cap, a terminal post, a first isolator, a second isolator, and an insulator. The end cap may be provided with a mounting hole, and the mounting hole may run through the end cap in a thickness direction of the end cap. The terminal post may include a body segment arranged in the mounting hole in a penetrating manner. In the thickness direction of the end cap, the first isolator and the second isolator may be respectively arranged on two sides of the end cap and cooperatively insulate and isolate the end cap from the terminal post. The insulator may enclose the body segment in a circumferential direction of the body segment. In the thickness direction of the end cap, the first isolator and the second isolator may form a gap at a position opposite the mounting hole.

16 Claims, 9 Drawing Sheets

(51) Int. Cl.
*H01M 50/152* (2021.01)
*H01M 50/179* (2021.01)
*H01M 50/559* (2021.01)

(56) References Cited

FOREIGN PATENT DOCUMENTS

| | | | |
|---|---|---|---|
| CN | 211507691 | U | 9/2020 |
| JP | 2003-086151 | A | 3/2003 |
| WO | 2021/203642 | A1 | 10/2021 |
| WO | 2021/208317 | A1 | 10/2021 |

OTHER PUBLICATIONS

Extended European Search Report issued Dec. 10, 2024 in European Patent Application No. 22884889.1.

* cited by examiner

END CAP ASSEMBLY, BATTERY CELL, BATTERY, AND POWER CONSUMING DEVICE

CROSS-REFERENCE TO RELATED APPLICATIONS

The present application is a continuation of International Application No. PCT/CN2022/073581, filed on Jan. 24, 2022, which claims the priority of Chinese patent application CN 202122633976.0, entitled "END CAP ASSEMBLY, BATTERY CELL, BATTERY, AND POWER CONSUMING DEVICE" and filed on Oct. 29, 2021, each of which is incorporated herein by reference in its entirety.

TECHNICAL FIELD

The present application relates to the technical field of batteries, and in particular to an end cap assembly, a battery cell, a battery and a power consuming device.

BACKGROUND ART

Lithium ion batteries have many outstanding advantages, such as high energy density, low environmental pollution, high power density, long service life, wide adaptation range, small self-discharge factor, etc. The lithium ion batteries are currently one of the most widely used batteries in the world, and also serve as an important part of new energy development. A battery cell of the lithium ion battery is obtained by assembling a positive electrode plate, a negative electrode plate and a separator into an electrode assembly (a bare cell) by means of winding or stacking, etc., loading the electrode assembly into a housing, then covering the electrode assembly with an end cap, and finally injecting an electrolyte solution. However, with continuous development of lithium ion battery technology, higher requirements are put forward for the safety performance and the cycle service life of the lithium ion batteries. Moreover, battery cells in conventional batteries are extremely prone to short circuiting or to corrosion of the housing during later use, resulting in great potential safety hazards of the batteries, which is not conducive to safe use by consumers.

SUMMARY OF THE DISCLOSURE

Embodiments of the present application provide an end cap assembly, a battery cell, a battery and a power consuming device, which can effectively reduce potential safety hazards of a battery in use.

In a first aspect, the embodiments of the present application provide an end cap assembly, including an end cap, a terminal post, a first isolator, a second isolator, and an insulator, wherein the end cap is provided with a mounting hole, and the mounting hole runs through the end cap in a thickness direction of the end cap; the terminal post is configured to be electrically connected to an electrode assembly, and the terminal post includes a body segment arranged in the mounting hole in a penetrating manner; in the thickness direction of the end cap, the first isolator and the second isolator are respectively arranged on two sides of the end cap, and the first isolator and the second isolator are configured to cooperatively insulate and isolate the end cap from the terminal post; the insulator encloses the body segment in a circumferential direction of the body segment, and the insulator is configured to prevent the body segment from coming into contact with a conductive medium entering the mounting hole; and wherein in the thickness direction of the end cap, the first isolator and the second isolator form a gap at a position opposite the mounting hole, and two ends of the insulator both extend beyond the gap.

In the above technical solution, the first isolator and the second isolator are respectively arranged on the two sides of the end cap, so that the first isolator and the second isolator can cooperatively insulate and isolate the end cap from the terminal post. Since the first isolator and the second isolator form the gap at the position corresponding to the mounting hole, conductive crystals are formed after the end cap assembly is contaminated by an electrolyte solution and the electrolyte solution enters the gap, and the insulator can thus effectively insulate and isolate the terminal post from the crystals formed by the electrolyte solution at the gap by enclosing the outer peripheral side of the body segment of the terminal post with the insulator and extending both the two ends of the insulator beyond the gap. In addition, the insulator can also insulate and isolate the terminal post from burrs formed during machining of a hole wall of the mounting hole, so that the phenomenon of current conduction between the terminal post and the end cap can be effectively reduced, facilitating the reduction of the risk of short circuiting of the battery cell provided with such an end cap assembly, and the potential safety hazard of electric corrosion of the end cap of the end cap assembly or the housing of the battery cell can be effectively reduced.

In some embodiments, the first isolator is provided with an isolation portion extending into the mounting hole, and the isolation portion is configured to insulate and isolate the end cap from the body segment; and the isolation portion and the second isolator form the gap in the thickness direction of the end cap.

In the above technical solution, the first isolator is provided with the isolation portion and the isolation portion extends into the mounting hole, that is to say, the isolation portion is located between the body segment of the terminal post and the hole wall of the mounting hole, so that the effect of the first isolator insulating and isolating the body segment of the terminal post from the hole wall of the mounting hole can be improved, and the reduction of the size of the gap formed between the first isolator and the second isolator is facilitated, thereby further reducing the risk of current conduction between the terminal post and the end cap.

In some embodiments, the end cap has opposite first and second sides in the thickness direction of the end cap, and the second side is configured to face the electrode assembly; the end cap assembly further includes a connecting member connected to the terminal post and located on the first side, and in the thickness direction of the end cap, at least part of the first isolator is located between the connecting member and the end cap so as to insulate and isolate the connecting member from the end cap; wherein in the thickness direction of the end cap, the connecting member has a first abutting face configured to abut against the first isolator, the insulator has a first end extending out of the first side, and the first abutting face is closer to the end cap than the first end.

In the above technical solution, the connecting member is arranged on the first side of the end cap, and the connecting member is connected to the terminal post so that the terminal post can be fixed to the end cap via the connecting member. The first end of the insulator extends out of the first side of the end cap and the first end is arranged farther away from the end cap than the first abutting face of the connecting member, that is to say, the first end of the insulator extends beyond the first abutting face of the connecting member, so that the insulator using such a structure can insulate and isolate the terminal post from the crystals formed after the electrolyte solution permeates between the connecting member and the first isolator, so as to further mitigate the risk of current conduction between the terminal post and the end cap.

In some embodiments, the terminal post further includes a first connecting segment connected to the body segment and located on the first side, the first connecting segment being configured to press the connecting member against the first isolator.

In the above technical solution, the terminal post has a first connecting segment located on the first side of the end cap, and the connecting member can be pressed against the first isolator by means of the first connecting segment, so that the terminal post can be fastened to the end cap by means of the connecting member, so as to improve the mounting stability and reliability of the terminal post.

In some embodiments, the terminal post further includes a second connecting segment connected to the body segment and located on the second side, the second connecting segment being configured to be electrically connected to the electrode assembly, and in the thickness direction of the end cap, at least part of the second isolator is located between the second connecting segment and the end cap so as to insulate and isolate the second connecting segment from the end cap; wherein in the thickness direction of the end cap, the second isolator has a second abutting face configured to abut against the second connecting segment, the insulator has a second end extending out of the second side, and the second abutting face is closer to the end cap than the second end.

In the above technical solution, the terminal post has the second connecting segment located on the second side of the end cap, and the second connecting segment abuts against the second side of the end cap by means of the second isolator, so that the terminal post can be fixed to the end cap by means of the second connecting segment, and the second isolator can effectively isolate the second connecting segment from the second side of the end cap. The second end of the insulator extends beyond the second side of the end cap and the second end is arranged farther away from the end cap than the second abutting face of the first isolator, that is to say, the second end of the insulator extends beyond the second abutting face of the second isolator, so that an insulated isolation effect between the end cap and the terminal post can be further enhanced.

In some embodiments, the end cap assembly further includes a seal fitted outside the insulator and located in the mounting hole, the seal being configured to seal the isolation portion from the second isolator.

In the above technical solution, the seal is arranged between the isolation portion of the first isolator and the second isolator, that is to say, the seal is arranged in the gap formed between the isolation portion of the first isolator and the second isolator, so that a sealing effect between the isolation portion of the first isolator and the second isolator can be improved, so as to reduce the risk of permeation of the electrolyte solution.

In some embodiments, an outer peripheral face of the body segment is provided with an annular groove extending in the circumferential direction of the body segment, and the annular groove is configured to receive the insulator.

In the above technical solution, the outer peripheral face of the body segment of the terminal post is provided with an annular groove configured to receive the insulator, so that this structure can function to limit the insulator to some extent so as to reduce a phenomenon of movement of the insulator relative to the body segment, and can also function to position the insulator to some extent so as to facilitate mounting of the insulator during production.

In some embodiments, an outer peripheral face of the insulator does not extend beyond the outer peripheral face of the body segment in a radial direction of the terminal post.

In the above technical solution, the outer peripheral face of the insulator is configured to not extend beyond the outer peripheral face of the body segment, that is to say, the insulator is completely received in the annular groove, so that the insulator can be better protected.

In some embodiments, the insulator has a thickness of 0.005 mm-1.5 mm.

In the above technical solution, by setting the thickness of the insulator from mm to 1.5 mm, it is possible to reduce the risk of poor insulating effect due to an excessively small thickness of the insulator, and to alleviate a phenomenon in which a space of the terminal post is occupied due to an excessively large thickness of the insulator and thus the current conduction capacity of the terminal post is poor.

In some embodiments, the insulator is an insulating film fitted outside the body segment.

In some embodiments, the insulator is an insulating layer applied to an outer surface of the body segment.

In some embodiments, the insulator is an insulating layer formed on an outer surface of the terminal post by means of a physico-chemical reaction.

In a second aspect, the embodiments of the present application further provide a battery cell, including an electrode assembly, a housing and the end cap described above; wherein the housing has an opening and is configured to receive the electrode assembly; and the end cap is configured to cover the opening, and the terminal post is electrically connected to the electrode assembly.

In a third aspect, the embodiments of the present application further provide a battery, including a case and the battery cell described above, wherein the case is configured to receive the battery cell.

In a fourth aspect, the embodiments of the present application further provide a power consuming device, including the battery described above.

In a fifth aspect, the embodiments of the present application further provide a method for manufacturing an end cap assembly, the manufacturing method including: providing an end cap provided with a mounting hole, the mounting hole running through the end cap in a thickness direction of the end cap; providing a terminal post including a body segment; providing an insulator; providing a first isolator and a second isolator; enclosing the body segment with the insulator in a circumferential direction of the body segment; inserting the terminal post into the mounting hole such that the body segment is arranged in the mounting hole in a penetrating manner; arranging the first isolator and the second isolator on two sides of the end cap respectively such that the first isolator and the second isolator are configured to cooperatively insulate and isolate the end cap from the terminal post; wherein the first isolator and the second isolator form a gap at a position opposite the mounting hole in the thickness direction of the end cap, two ends of the insulator both extend beyond the gap, and the insulator is configured to prevent the body segment from coming into contact with a conductive medium entering the mounting hole.

In a sixth aspect, the embodiments of the present application further provide a apparatus for manufacturing an end cap assembly, the manufacturing apparatus including a first provision device, a second provision device, a third provision device, a fourth provision device, a first assembly device, a second assembly device, and a third assembly device, wherein the first provision device is configured to provide an end cap provided with a mounting hole, the mounting hole running through the end cap in a thickness direction of the end cap; the second provision device is configured to provide a terminal post including a body segment; the third provision device is configured to provide an insulator; the fourth provision device is configured to provide a first isolator and a second isolator; the first assembly device is configured to enclose the body segment with the insulator in a circumferential direction of the body segment; the second assembly device is configured to insert the terminal post into the mounting hole such that the body segment is arranged in the mounting hole in a penetrating manner; the third assembly device is configured to arrange the first isolator and the second isolator on two sides of the end cap respectively such that the first isolator and the second isolator are configured to cooperatively insulate and isolate the end cap from the terminal post; wherein the first isolator and the second isolator form a gap at a position opposite the mounting hole in the thickness direction of the end cap, two ends of the insulator both extend beyond the gap, and the insulator is configured to prevent the body segment from coming into contact with a conductive medium entering the mounting hole.

BRIEF DESCRIPTION OF THE DRAWINGS

In order to more clearly describe the technical solutions of embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
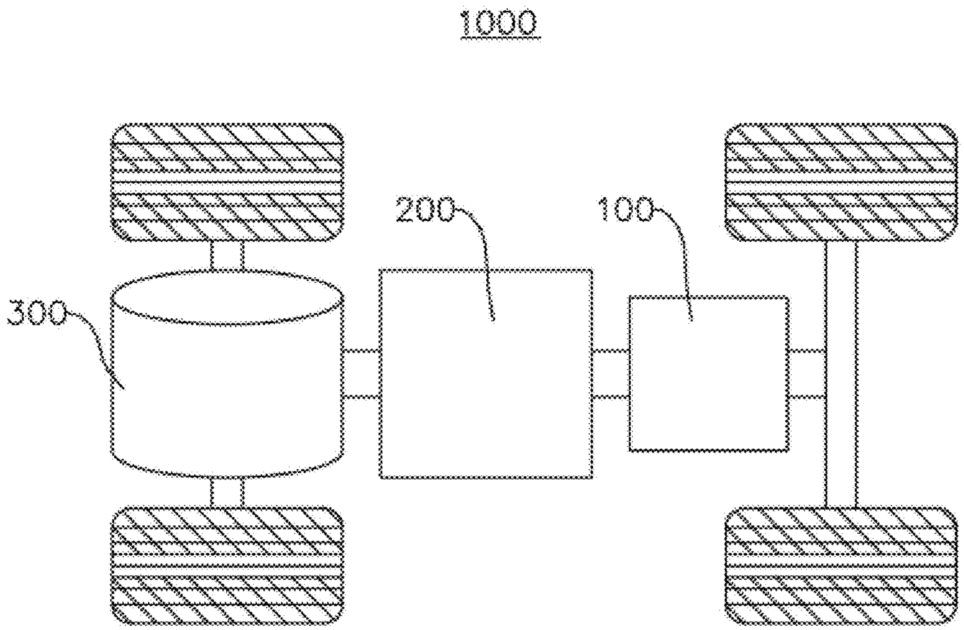
FIG. 1 is a schematic structural diagram of a vehicle according to some embodiments of the present application.

List of reference signs: 1000—Vehicle; 100—Battery; 10—Case; 11—First portion; 12—Second portion; 20—Battery cell; 21—Electrode assembly; 211—Tab; 22—Housing; 221—Opening; 23—End cap assembly; 231—End cap; 2311—Mounting hole; 2312—First side; 2313—Second side; 232—Terminal post; 2321—Body segment; 2322—First connecting segment; 2323—Second connecting segment; 2324—Annular groove; 233—First isolator; 2331—Isolation portion; 2332—Extension portion; 234—Second isolator; 2341—Second abutting face; 235—Insulator; 236—Gap; 237—Pressure relief mechanism; 238—Connecting member; 2381—First abutting face; 239—Seal; 200—Controller; 300—Motor; 2000—Manufacturing apparatus; 2100—First provision device; 2200—Second provision device; 2300—Third provision device; 2400—Fourth provision device; 2500—First assembly device; 2600—Second assembly device; 2700—Third assembly device.

DETAILED DESCRIPTION OF EMBODIMENTS

In order to make the objectives, technical solutions and advantages of embodiments of the present application clearer, the technical solutions in the embodiments of the present application will be described clearly below with reference to the accompanying drawings in the embodiments of the present application. Obviously, the embodiments described are some of, rather than all of, the embodiments of the present application. All other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, the phrase "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skill in the art, the specific meanings of the foregoing terms in the present application may be understood according to specific circumstances.

The term "and/or" in the present application is merely a description of the associated relationship of associated objects, representing that three relationships may exist, for example, A and/or B, may be expressed as: only A exists, both A and B exist, and only B exists. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated device are merely illustrative and should not be construed to limit the present application in any way.

The phrase "plurality of" appearing in the present application means two or more (including two).

In the present application, a battery cell may include a lithium ion secondary battery, a lithium ion primary battery, a lithium-sulfur battery, a sodium-lithium ion battery, a sodium ion battery or a magnesium ion battery, etc., which will not be limited in the embodiments of the present application. The battery cell may be cylindrical, flat, cuboid or in other shapes, which is also not limited in embodiments of the present application. The battery cells are generally classified into three types depending on the way of package: cylindrical battery cells, prismatic battery cells and pouch battery cells, which also will not be limited in the embodiments of the present application.

A battery mentioned in embodiments of the present application refers to a single physical module including one or more battery cells to provide a higher voltage and capacity. For example, the battery mentioned in the present application may include a battery module, a battery pack, etc. The battery generally includes a case for packaging one or more battery cells or a plurality of battery modules. The case can prevent liquid or other foreign matters from affecting charging or discharging of the battery cell(s).

The battery cell further includes a shell, an electrode assembly and an electrolyte solution. The shell is configured to receive the electrode assembly and the electrolyte solution. The electrode assembly may be composed of a positive electrode plate, a negative electrode plate, and a separator. The battery cell operates mainly by relying on movements of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium ion battery as an example, the positive electrode current collector may be made of an aluminum, and the positive electrode active material may be lithium cobalt oxide, lithium iron phosphate, ternary lithium, lithium manganate, etc. The negative electrode plate includes a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative electrode current collector may be made of copper, and the negative electrode active material may be carbon, silicon, etc. In order to ensure that no fusing occurs when a large current passes, there are a plurality of positive tabs are provided and are stacked together, and a plurality of negative tabs are provided and are stacked together.

The separator may be made of PP (polypropylene), PE (polyethylene), etc. In addition, the electrode assembly may be of a wound structure or a laminated structure, which will not be limited in the embodiments of the present application.

Lithium ion batteries have many outstanding advantages, such as high energy density, low environmental pollution, high power density, long service life, wide adaptation range, small self-discharge factor, etc. The lithium ion batteries are currently one of the most widely used batteries in the world, and also serve as an important part of new energy development. A battery cell of the lithium ion battery is obtained by assembling a positive electrode plate, a negative electrode plate and a separator into an electrode assembly (a bare cell) by means of winding or stacking, etc., loading the electrode assembly into a housing, then covering the electrode assembly with an end cap, and finally injecting an electrolyte solution. However, with continuous development of lithium ion battery technology, higher requirements are put forward for the safety performance and the cycle service life of the lithium ion batteries.

The inventors have found that, with regard to a common battery cell, the battery cell is generally provided with a mounting hole in an end cap, a terminal post is riveted to the end cap after being arranged in the mounting hole in a penetrating manner, and the terminal post is electrically connected to an electrode assembly received in a housing, such that the terminal post serves as a positive output terminal or a negative output terminal of the battery cell, thereby achieving input and output of electric energy of the battery cell. In the prior art, in order to ensure the insulation between the terminal post and the end cap, and to preventing conduction of current between the terminal post and the end cap and the housing, an upper plastic and a lower plastic are generally provided on two sides of the end cap, and the upper plastic or the lower plastic partially extends to a position between a hole wall of the mounting hole and the terminal post, so as to achieve insulated isolation between the terminal post and the end cap. However, in the battery cell with such a structure, there are gaps respectively between the upper plastic and the end cap and between the upper plastic and the lower plastic, as a result, when the battery cell is contaminated by the electrolyte solution from the outside, the electrolyte solution will permeate into the gaps between the upper plastic and the end cap and between the upper plastic and the lower plastic, and form conductive crystals, thereby causing a phenomenon in which current is conducted between the terminal post and the end cap, and making the end cap and the housing of the battery cell charged. Thus, it is extremely likely to cause a phenomenon of short circuiting of the battery cell or electric corrosion of the housing during later use, resulting in a great potential safety hazard of the battery cell, which is not conducive to safe use by consumers, nor to the prolonging of the service life of the battery cell.

On the basis of the above considerations, in order to solve the problems of great potential safety hazard and short service life of the battery cell during later use, after thorough research, the inventors have designed an end cap assembly. The end cap assembly includes an end cap, a terminal post, a first isolator, a second isolator and an insulator. The end cap is provided with a mounting hole, and the mounting hole runs through two sides of the end cap in a thickness direction of the end cap. The terminal post has a body segment inserted into the mounting hole. The first isolator and the second isolator are respectively arranged on the two sides of the end cap in the thickness direction of the end cap, the first isolator and the second isolator are configured to cooperatively insulate and isolate the end cap from the terminal post, and in the thickness direction of the end cap, the first isolator and the second isolator form a gap at a position opposite the mounting hole. The insulator encloses an outer peripheral side of the body segment, two ends of the insulator both extend beyond the gap, and the insulator is configured to prevent the body segment from coming into contact with a conductive medium entering the mounting hole.

In the battery cell provided with such an end cap assembly, the first isolator and the second isolator are respectively arranged on the two sides of the end cap, so that the first isolator and the second isolator can cooperatively insulate and isolate the end cap from the terminal post. Since the first isolator and the second isolator form the gap at the position corresponding to the mounting hole, conductive crystals are formed after the end cap assembly is contaminated by an electrolyte solution and the electrolyte solution enters the gap, and the insulator can thus effectively insulate and isolate the terminal post from the crystals formed by the electrolyte solution at the gap by enclosing the outer peripheral side of the body segment of the terminal post with the insulator and extending both the two ends of the insulator beyond the gap. In addition, the insulator can also insulate and isolate the terminal post from burrs formed during machining of a hole wall of the mounting hole, so that the phenomenon of current conduction between the terminal post and the end cap can be effectively reduced, facilitating the reduction of the risk of short circuiting of the battery cell provided with such an end cap assembly, and the potential safety hazard of electric corrosion of the end cap of the end cap assembly or the housing of the battery cell can be effectively reduced.

The end cap assembly disclosed in the embodiments of the present application may be used in, but not limited to, a power consuming device such as a vehicle, a ship or an aircraft. A power supply system, which is provided with the power consuming device composed of the end cap assembly, the battery cell, etc. disclosed in the present application, may be used, and thus the alleviation of the phenomenon of short circuiting or electric corrosion of the battery cell is facilitated, so as to prolong the service life and improve the safety of the battery cell.

The embodiments of the present application provide a power consuming device using a battery as a power supply. The power consuming device may be, but is not limited to, a cell phone, a tablet, a laptop, an electric toy, an electric tool, an electromobile, an electric vehicle, a ship, a spacecraft, etc. The electric toy may include a stationary or mobile electric toy, such as a game console, an electric vehicle toy, an electric ship toy, and an electric airplane toy. The spacecraft may include an airplane, a rocket, a space shuttle, a spaceship, etc.

Hereinafter, for the convenience of illustration, a vehicle 1000 is taken as an example to describe an electrical apparatus according to an example of the present application.

Referring to FIG. 1, FIG. 1 is a schematic structural diagram of a vehicle 1000 according to some embodiments of the present application. The vehicle 1000 may be a fuel vehicle, a gas vehicle, or a new energy vehicle. The new energy vehicle may be a battery electric vehicle, a hybrid electric vehicle, an extended-range vehicle, etc. A battery 100 is provided inside the vehicle 1000, and the battery 100 may be provided at the bottom, the front or the back of the vehicle 1000. The battery 100 may be configured to supply power to the vehicle 1000. For example, the battery 100 may be used as a power supply for operating the vehicle 1000. The vehicle 1000 may further include a controller 200 and a motor 300. The controller 200 is configured to control the battery 100 to supply power to the motor 300, for example, to meet working power requirements during starting, navigation and traveling of the vehicle 1000.

In some embodiments of the present application, the battery 100 can not only serve as a power supply for operating the vehicle 1000, but also serve as a power supply for driving the vehicle 1000, instead of or partially instead of fuel or natural gas, to provide driving power for the vehicle 1000.

Figure 2:
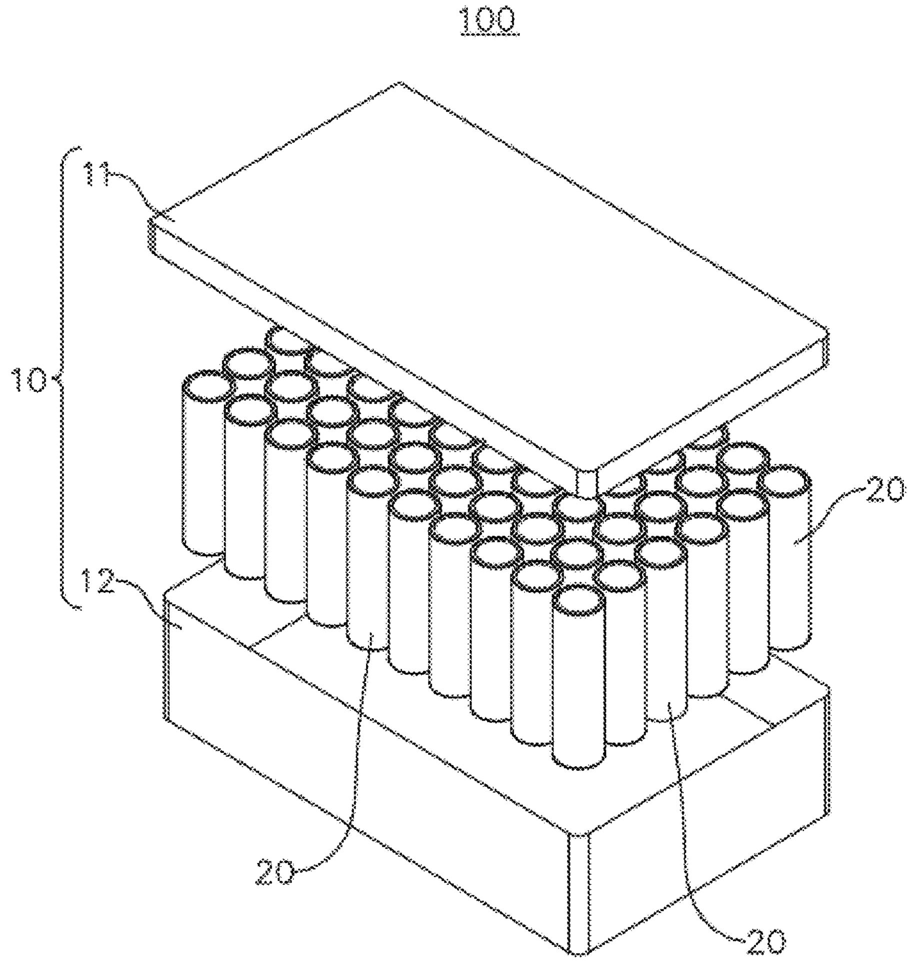
FIG. 2 is an exploded structural diagram of a battery according to some embodiments of the present application.

Referring to FIG. 2, FIG. 2 is an exploded structural diagram of the battery 100 according to some embodiments of the present application. The battery 100 includes a case 10 and a battery cell 20. The case 10 is configured to receive the battery cell 20. The case 10 is configured to provide an assembly space for the battery cell 20, and the case 10 may be of various structures. In some embodiments, the case 10 may include a first portion 11 and a second portion 12. The first portion 11 and the second portion 12 are fitted to each other in a covering manner. The first portion 11 and the second portion 12 jointly define the assembly space for receiving the battery cell 20. The second portion 12 may be of a hollow structure with one end open, the first portion 11 may be of a plate-like structure, and the first portion 11 covers an open side of the second portion 12 such that the first portion 11 and the second portion 12 jointly define the assembly space; and the first portion 11 and the second portion 12 may also each be of a hollow structure with one side open, and the open side of the first portion 11 covers the open side of the second portion 12. Of course, the case 10 formed by the first portion 11 and the second portion 12 may be in various shapes, such as a cylinder and a cuboid.

In the battery 100, one or more battery cells 20 may be provided. When a plurality of battery cells 20 are provided, the plurality of battery cells 20 may be connected in series, in parallel, or in series-parallel. The series-parallel connection refers that some of the plurality of battery cells 20 are connected in series and the rest are connected in parallel. The plurality of battery cells 20 may be directly connected to each other in series or in parallel or in series-parallel, and then a whole body composed of the plurality of battery cells 20 is accommodated in the case 10. Of course, the battery 100 may also be a unit received in the case 10 that is formed by firstly connecting a plurality of battery cells 20 in series or in parallel or in series-parallel to form a plurality of battery modules, and then connecting the plurality of battery modules in series or in parallel or in series-parallel. The battery 100 may further include other structures. For example, the battery 100 may further include a busbar component for achieving electrical connections between the plurality of battery cells 20.

Each battery cell 20 may be a secondary battery or a primary battery, and may also be a lithium-sulfur battery, a sodium ion battery, or a magnesium ion battery, but is not limited thereto. The battery cell 20 may be in the shape of a cylinder, a flat body, a cuboid, etc.

Figure 3:
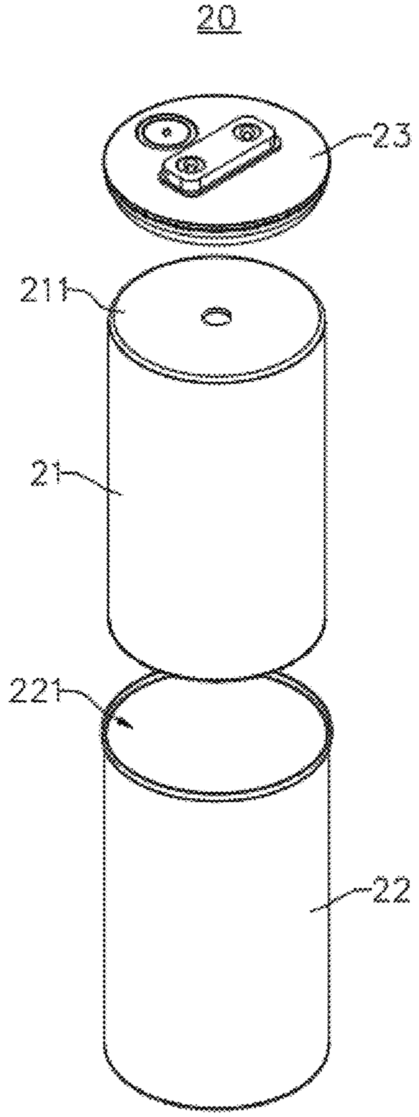
FIG. 3 is an exploded structural diagram of a battery cell according to some embodiments of the present application.

Referring to FIG. 3, FIG. 3 is an exploded structural diagram of a battery cell 20 according to some embodiments of the present application. The battery cell 20 includes an electrode assembly 21, a housing 22 and an end cap assembly 23. The housing 22 has an opening 221, and the housing 22 is configured to receive the electrode assembly 21. The end cap assembly 23 is configured to cover the opening 221 of the housing 22, and the end cap assembly 23 is configured to be electrically connected to the electrode assembly 21.

The electrode assembly 21 is a component in the battery cell 20 where an electrochemical reaction occurs, a tab 211 is formed at the end of the electrode assembly 21 facing the end cap assembly 23, and the tab 211 is configured to be electrically connected to the end cap assembly 23 so as to enable input or output of electric energy of the battery cell 20. The electrode assembly 21 may include a positive electrode plate, a negative electrode plate, and a separator. The electrode assembly 21 may be of a winding structure formed by winding the positive electrode plate, the separator and the negative electrode plate, or a laminated structure formed by laminating the positive electrode plate, the separator and the negative electrode plate. Illustratively, as shown in FIG. 3, the electrode assembly 21 may be of the wound structure formed by winding the positive electrode plate, the separator and the negative electrode plate.

The housing 22 may also be configured to receive an electrolyte, such as an electrolyte solution. The housing 22 may be in various structural forms. The housing 22 may also be made of various materials, such as copper, iron, aluminum, steel, and aluminum alloy.

In some embodiments, the housing 22 is of a hollow structure with an opening 221 in one side thereof, the end cap assembly 23 covers the opening 221 of the housing 22 and forms a sealed connection so as to form a sealed space for receiving the electrode assembly 21 and the electrolyte. When the battery cell 20 is being assembled, the electrode assembly 21 may be first placed in the housing 22, the housing 22 may be filled with the electrolyte, and the end cap assembly 23 may then cover the opening 221 of the housing 22.

The housing 22 may have various shapes such as a cylinder and a cuboid. The housing 22 may be shaped depending on the specific shape of the electrode assembly 21. For example, if the electrode assembly 21 is of a cylindrical structure, a cylindrical housing may be used; and if the electrode assembly 21 is of a cuboid structure, a cuboid housing may be used. Of course, the end cap assembly 23 may also be of various structures. The shape of the end cap assembly 23 may be adapted to that of the housing 22. For example, the end cap assembly 23 is of a plate-like structure, a hollow structure with an opening 221 at one end thereof, etc. Illustratively, in FIG. 3, the electrode assembly 21 is of a cylindrical structure, the housing 22 is then of a cylindrical structure, and the end cap assembly 23 covers the opening 221 of the housing 22.

It can be understood that the battery cell 20 is not merely limited to the above structures, and the battery cell 20 may also be of other structures. For example, the battery cell 20 includes a housing 22 and two end cap assemblies 23, the housing 22 is of a hollow structure with openings 221 on two opposite sides. One of the end cap assemblies 23 correspondingly covers one opening 221 of the housing 22, and forms a sealed connection so as to form a sealed space for receiving the electrode assembly 21 and the electrolyte.

It should be noted that, in the embodiments of the present application, one or more electrode assemblies 21 may be received in the housing 22. Illustratively, in FIG. 3, two electrode assemblies 21 are provided, and the two electrode assemblies 21 are arranged in a stacked manner.

The end cap assembly 23 is an assembly that covers the opening 221 of the housing 22 to isolate an internal environment of the battery cell 20 from an external environment.

Figure 4:
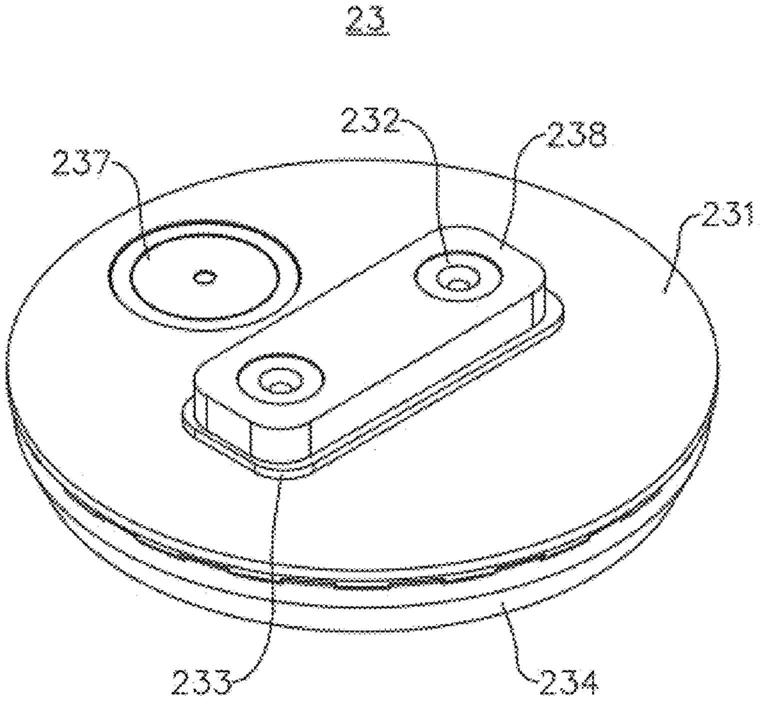
FIG. 4 is a schematic structural diagram of an end cap assembly according to some embodiments of the present application.
Figure 5:
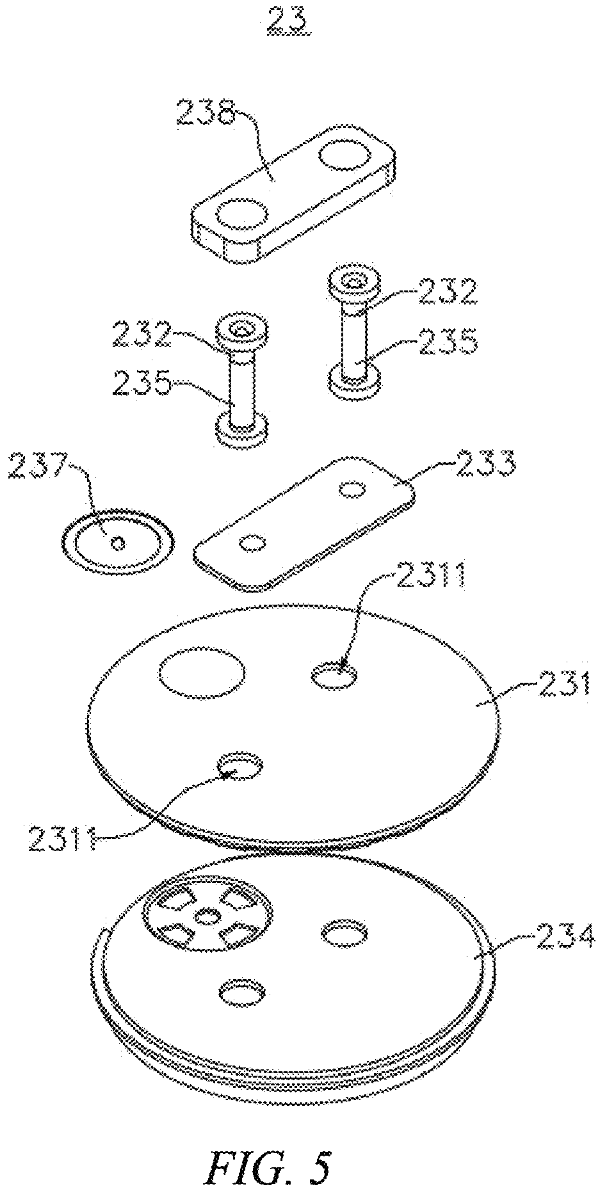
FIG. 5 is an exploded structural diagram of an end cap assembly according to some embodiments of the present application.
Figure 6:
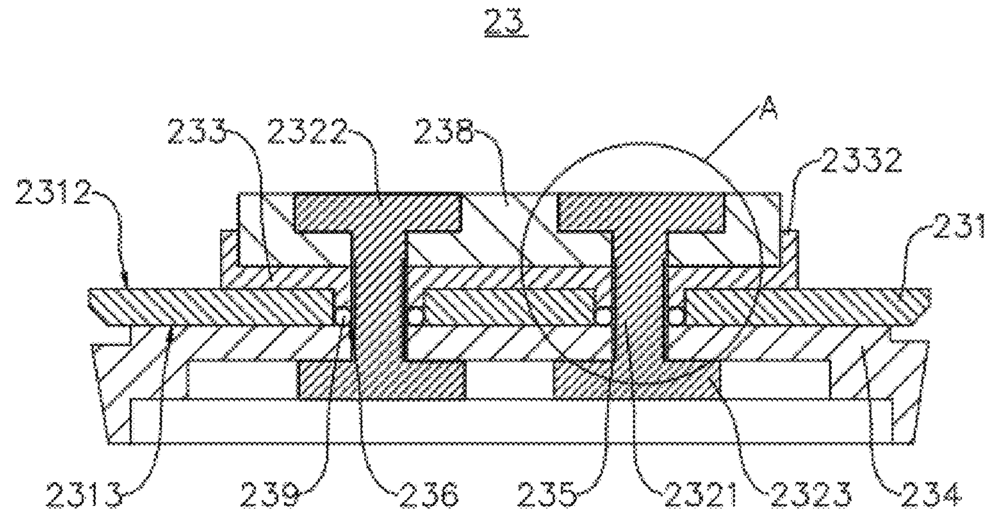
FIG. 6 is a cross-sectional view of an end cap assembly according to some embodiments of the present application.

According to some embodiments of the present application, reference is made to FIG. 3, and further reference is made to FIGS. 4, 5 and 6. FIG. 4 is a schematic structural diagram of the end cap assembly 23 according to some embodiments of the present application, FIG. 5 is an exploded structural diagram of the end cap assembly 23 according to some embodiments of the present application, and FIG. 6 is a cross-sectional view of the end cap assembly 23 according to some embodiments of the present application. The present application provides an end cap assembly 23. The end cap assembly 23 includes an end cap 231, a terminal post 232, a first isolator 233, a second isolator 234, and an insulator 235. The end cap 231 is provided with a mounting hole 2311, and the mounting hole 2311 runs through the end cap 231 in a thickness direction of the end cap 231. The terminal post 232 is configured to be electrically connected to an electrode assembly 21, and the terminal post 232 includes a body segment 2321 arranged in the mounting hole 2311 in a penetrating manner. In the thickness direction of the end cap 231, the first isolator 233 and the second isolator 234 are respectively arranged on two sides of the end cap 231, and the first isolator 233 and the second isolator 234 are configured to cooperatively insulate and isolate the end cap 231 from the terminal post 232. The insulator 235 encloses the body segment 2321 in a circumferential direction of the body segment 2321, and the insulator 235 is configured to prevent the body segment 2321 from coming into contact with a conductive medium entering the mounting hole 2311. In the thickness direction of the end cap 231, the first isolator 233 and the second isolator 234 form a gap 236 at a position opposite the mounting hole 2311, and two ends of the insulator 235 both extend beyond the gap 236.

By the body segment 2321 arranged in the mounting hole 2311 in a penetrating manner is meant that a part of the body segment 2321 is located in the mounting hole 2311, and two ends of the body segment 2321 both extend out of the mounting hole 2311. By the two ends of the insulator 235 both extending beyond the gap 236 is meant that in the thickness direction of the end cap 231, and at the position corresponding to the mounting hole 2311, the first isolator 233 has a first face arranged opposite the second isolator 234, the second isolator 234 has a second face arranged opposite the first face, the insulator 235 is correspondingly arranged at the gap 236 and the two ends of the insulator 235 respectively extend beyond the first face and the second face, that is to say, in a radial direction of the terminal post 232, the insulator 235 encloses a position of the body segment 2321 of the terminal post 232 corresponding to the gap 236, and the gap 236 is located within a projection of the insulator 235 in the radial direction of the terminal post 232.

The insulator 235 is configured to prevent the body segment 2321 from coming into contact with the conductive medium entering the mounting hole 2311. Illustratively, the conductive medium may be conductive crystals formed after an electrolyte solution permeates the gap 236, or burrs or brushed metal, etc. formed on a hole wall of the mounting hole 2311 during machining.

The terminal post 232 is configured to be connected to a tab 211 (which may be a positive tab or a negative tab) of the electrode assembly 21 so as to form an electrical connection between the terminal post 232 and the electrode assembly 21, so that electric energy of the battery cell 20 can be input and output by means of the terminal post 232. It should be noted that the terminal post 232 may be directly connected to the tab 211 of the electrode assembly 21, for example, by means of welding or abutment, etc. The terminal post may also be indirectly connected to the tab 211 of the electrode assembly 21 by means of other components. For example, the terminal post 232 is connected to the tab 211 of the electrode assembly 21 by means of an adapter piece, that is to say, the adapter piece is welded to or abuts against the tab 211 of the electrode assembly 21 and then is welded to or abuts against the terminal post 232.

Optionally, in FIG. 6, there are two terminal posts 232 for input and output of a positive output terminal or a negative output terminal of the battery cell 20, namely, the two terminal posts 232 are both connected to the tab 211 of the electrode assembly 21 so that the positive output terminal or the negative output terminal of the battery cell 20 is formed by means of both terminal posts 232. Outer peripheral sides of the two terminal posts 232 are both enclosed with insulators 235, two mounting holes 2311 are also formed at corresponding positions on the end cap 231, and the mounting holes 2311 are provided corresponding to the terminal posts 232. Of course, in other embodiments, one, three or four terminal posts 232 may be provided for input and output of the positive output terminal or the negative output terminal of the battery cell 20.

The terminal post 232 may be made of various materials, such as copper, iron, aluminum, steel, and an aluminum alloy.

Illustratively, the first isolator 233 and the second isolator 234 are an upper plastic and a lower plastic of the end cap assembly 23 respectively. Reference may be made to the related art for the specific structures of the first isolator 233 and the second isolator 234, which will not be described in detail herein.

In some embodiments, in FIGS. 4 and 5, the end cap assembly 23 may further include a pressure relief mechanism 237. The pressure relief mechanism 237 is mounted on the end cap 231. The pressure relief mechanism 237 is configured to release a pressure inside the battery cell 20 when an internal pressure or temperature of the battery cell 20 reaches a predetermined value.

Illustratively, the pressure relief mechanism 237 may be a component such as an explosion-proof valve, an explosion-proof plate, an air valve, a pressure relief valve, or a safety valve.

The first isolator 233 and the second isolator 234 are respectively arranged on the two sides of the end cap 231, so that the first isolator 233 and the second isolator 234 can cooperatively insulate and isolate the end cap 231 from the terminal post 232. Since the first isolator 233 and the second isolator 234 form the gap 236 at the position corresponding to the mounting hole 2311, conductive crystals are formed after the end cap assembly 23 is contaminated by the electrolyte solution and the electrolyte solution enters the gap 236, and the insulator 235 can thus effectively insulate and isolate the terminal post 232 from the crystals formed by the electrolyte solution at the gap 236 by enclosing the outer peripheral side of the body segment 2321 of the terminal post 232 with the insulator 235 and extending both the two ends of the insulator 235 beyond the gap 236. In addition, the insulator 235 can also insulate and isolate the terminal post 232 from burrs formed during machining of a hole wall of the mounting hole 2311, so that the phenomenon of current conduction between the terminal post 232 and the end cap 231 can be effectively reduced, facilitating the reduction of the risk of short circuiting of the battery cell 20 provided with such an end cap assembly 23, and the potential safety hazard of electric corrosion of the end cap 231 of the end cap assembly 23 or the housing 22 of the battery cell 20 can be effectively reduced.

Figure 7:
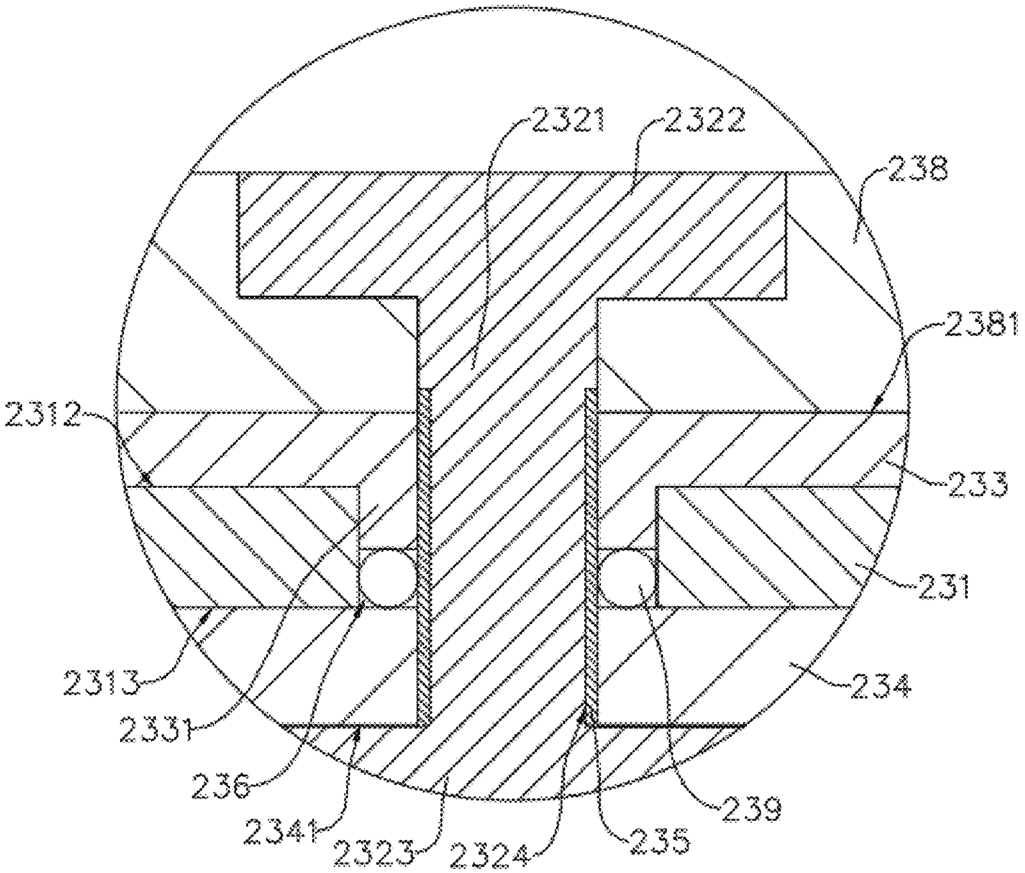
FIG. 7 is a partial enlarged view of part A of the end cap assembly shown in FIG. 6.

According to some embodiments of the present application, reference is made to FIG. 6, and further reference is made to FIG. 7. FIG. 7 is a partial enlarged view of part A of the end cap assembly 23 shown in FIG. 6. The first isolator 233 is provided with an isolation portion or structure 2331 extending into the mounting hole 2311, and the isolation portion 2331 is configured to insulate and isolate the end cap 231 from the body segment 2321. In the thickness direction of the end cap 231, the isolation portion 2331 and the second isolator 234 form a gap 236.

The isolation portion 2331 of the first isolator 233 extends into the mounting hole 2311 and is configured to insulate and isolate the end cap 231 from the body segment 2321, namely, the isolation portion 2331 is located between the body segment 2321 of the terminal post 232 and the hole wall of the mounting hole 2311, so that the isolation portion 2331 can insulate and isolate the end cap 231 from the body segment 2321.

It should be noted that in other embodiments, the second isolator 234 may be also provided with an isolation portion 2331, and the isolation portion 2331 extends to a position between the terminal post 232 and the hole wall of mounting hole 2311. In the thickness direction of the end cap 231, a gap 236 is formed between the isolation portion 2331 and the first isolator 233. Of course, the structure of the end cap assembly 23 is not limited thereto. For example, the first isolator 233 and the second isolator 234 may also each be provided with an isolation portion 2331, and the isolation portions 2331 extend to positions between the terminal post 232 and the hole wall of the mounting hole 2311. In the thickness direction of the end cap 231, a gap 236 is formed between the isolation portion 2331 of the first isolator 233 and the isolation portion 2331 of the second isolator 234.

The first isolator 233 is provided with the isolation portion 2331 and the isolation portion 2331 extends into the mounting hole 2311, so that the effect of the first isolator 233 insulating and isolating the body segment 2321 of the terminal post 232 from the hole wall of the mounting hole 2311 can be improved, and the reduction of the size of the gap 236 formed between the first isolator 233 and the second isolator 234 is facilitated, thereby further reducing the risk of current conduction between the terminal post 232 and the end cap 231.

According to some embodiments of the present application, with continued reference to FIGS. 6 and 7, in the thickness direction of the end cap 231, the end cap 231 has a first side 2312 and a second side 2313 that are opposite to each other, and the second side 2313 is configured to face the electrode assembly 21. The end cap assembly 23 further includes a connecting member or connector 238, the connecting member 238 is connected to the terminal post 232 and is located on the first side 2312, and in the thickness direction of the end cap 231, at least part of the first isolator 233 is located between the connecting member 238 and the end cap 231 so as to insulate and isolate the connecting member 238 from the end cap 231. In the thickness direction of the end cap 231, the connecting member 238 has a first abutting face 2381 configured to abut against the first isolator 233, the insulator 235 has a first end extending out of the first side 2312, and the first abutting face 2381 is closer to the end cap 231 than the first end.

The second side 2313 of the end cap 231 is configured to face the electrode assembly 21, namely, the second side 2313 of the end cap 231 is configured to face an interior of the housing 22 when the end cap assembly 23 covers the opening 221 of the housing 22, that is to say, the first side 2312 of the end cap 231 is the side facing away from the interior of the housing 22, that is, an outer side of the battery cell 20.

Illustratively, the connecting member is a riveting block such that the terminal post 232 can be riveted to the end cap 231 by means of the riveting block.

In some embodiments, as shown in FIG. 6, the first isolator 233 further has an extension portion 2332, the extension portion 2332 extends away from the end cap 231 in the thickness direction of the end cap 231, and the extension portion 2332 is an annular structure extending in a circumferential direction of the connecting member 238, such that the extension portion 2332 encloses an outer peripheral side of the connecting member 238 in the circumferential direction of the connecting member 238, thereby facilitating improvement of the effect of the first isolator 233 insulating and isolating the end cap 231 from the connecting member 238, to reduce the risk of current conduction between the end cap 231 and the connecting member 238.

The connecting member 238 is arranged on the first side 2312 of the end cap 231, and the connecting member 238 is connected to the terminal post 232 so that the terminal post 232 can be fixed to the end cap 231 via the connecting member 238. The first end of the insulator 235 extends out of the first side 2312 of the end cap 231 and the first end is arranged farther away from the end cap 231 than the first abutting face 2381 of the connecting member 238, that is to say, the first end of the insulator 235 extends beyond the first abutting face 2381 of the connecting member 238, so that the insulator 235 using such a structure can insulate and isolate the terminal post 232 from the crystals formed after the electrolyte solution permeates between the connecting member 238 and the first isolator 233, so as to further mitigate the risk of current conduction between the terminal post 232 and the end cap 231.

According to some embodiments of the present application, referring to FIGS. 6 and 7, the terminal post 232 further includes a first connecting segment or structure 2322. The first connecting segment 2322 is connected to the body segment 2321 and located on the first side 2312, and the first connecting segment 2322 is configured to press the connecting member 238 against the first isolator 233.

The first connecting segment 2322 is connected to the end of the body segment 2321 extending out of the first side 2312 of the end cap 231, and a radial dimension of the first connecting segment 2322 is greater than that of the body segment 2321, so that the first connecting segment 2322 can be pressed against the connecting member 238, thereby riveting the terminal post 232 to the end cap 231.

The terminal post 232 has the first connecting segment 2322 located on the first side 2312 of the end cap 231, and the connecting member 238 can be pressed against the first isolator 233 by means of the first connecting segment 2322, so that the terminal post 232 can be fastened to the end cap 231 by means of the connecting member 238, so as to improve the mounting stability and reliability of the terminal post 232.

According to some embodiments of the present application, with continued reference to FIGS. 6 and 7, the terminal post 232 further includes a second connecting segment or structure 2323. The second connecting segment 2323 is connected to the body segment 2321 and located on the second side 2313, the second connecting segment 2323 is configured to be electrically connected to the electrode assembly 21, and in the thickness direction of the end cap 231, at least part of the second isolator 234 is located between the second connecting segment 2323 and the end cap 231 so as to insulate and isolate the second connecting segment 2323 from the end cap 231. In the thickness direction of the end cap 231, the second isolator 234 has a second abutting face 2341 configured to abut against the second connecting segment 2323, the insulator 235 has a second end extending out of the second side 2313, and the second abutting face 2341 is closer to the end cap 231 than the second end.

In the thickness direction of the end cap 231, at least part of the second isolator 234 is located between the second connecting segment 2323 and the end cap 231, and the second isolator 234 has the second abutting face 2341 configured to abut against the second connecting segment 2323, namely, the second connecting segment 2323 abuts against the second side 2313 of the end cap 231 by means of the second isolator 234, so that the second connecting segment 2323 can cooperate with the first connecting segment 2322 and the connecting member 238 to fasten the terminal post 232 to the end cap 231.

The terminal post 232 has the second connecting segment 2323 located on the second side 2313 of the end cap 231, and the second connecting segment 2323 abuts against the second side 2313 of the end cap 231 by means of the second isolator 234, so that the terminal post 232 can be fixed to the end cap 231 by means of the second connecting segment 2323, and the second isolator 234 can effectively isolate the second connecting segment 2323 from the second side 2313 of the end cap 231. The second end of the insulator 235 extends beyond the second side 2313 of the end cap 231 and the second end is arranged farther away from the end cap 231 than the second abutting face 2341 of the first isolator 233, that is to say, the second end of the insulator 235 extends beyond the second abutting face 2341 of the second isolator 234, so that an insulated isolation effect between the end cap 231 and the terminal post 232 can be further enhanced.

According to some embodiments of the present application, referring to FIGS. 6 and 7, the end cap assembly 23 further includes a seal 239. The seal 239 is fitted outside the insulator 235, the seal 239 is located in the mounting hole 2311, and the seal 239 is configured to seal the isolation portion 2331 from the second isolator 234.

By the seal 239 being fitted outside the insulator 235, and the seal 239 being located in the mounting hole 2311, it is meant that the seal 239 is located between the body segment 2321 of the terminal post 232 and the hole wall of the mounting hole 2311, and in the thickness direction of the end cap 231, the seal 239 is located in the gap 236 formed between the isolation portion 2331 of the first isolator 233 and the second isolator 234.

Illustratively, the seal 239 is a sealing ring, and the seal 239 may be made of a plastic, a silicone or a rubber, etc.

It should be noted that the seal 239 is fitted outside the insulator 235, and the seal 239 and the insulator 235 may be of an integral structure, or may be of a split structure. That is to say, the seal 239 and the insulator 235 may be of a structure formed by means of an integral molding process, or may be independent of each other, and the seal 239 is fitted on the outer peripheral side of the insulator 235. In FIG. 7, the seal 239 and the insulator 235 are of a split structure.

The seal 239 is arranged between the isolation portion 2331 of the first isolator 233 and the second isolator 234, that is to say, the seal 239 is arranged in the gap 236 formed between the isolation portion 2331 of the first isolator 233 and the second isolator 234, so that a sealing effect between the isolation portion 2331 of the first isolator 233 and the second isolator 234 can be improved, so as to reduce the risk of permeation of the electrolyte solution.

Figure 8:
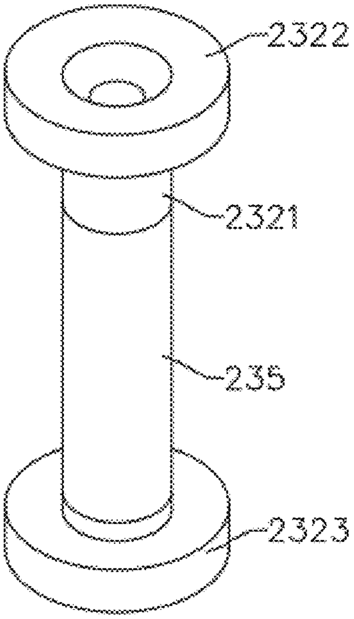
FIG. 8 is a schematic diagram of the connection between a terminal post and an insulator according to some embodiments of the present application.
Figure 9:
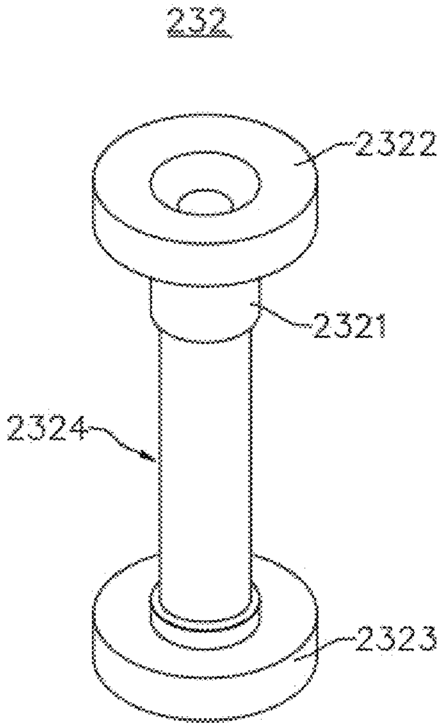
FIG. 9 is a schematic structural diagram of a terminal post according to some embodiments of the present application.

According to some embodiments of the present application, reference is made to FIG. 7, and further reference is made to FIGS. 8 and 9. FIG. 8 is a schematic diagram of the connection between the terminal post 232 and the insulator 235 according to some embodiments of the present application, and FIG. 9 is a schematic structural diagram of the terminal post 232 according to some embodiments of the present application. An outer peripheral face of the body segment 2321 is provided with an annular groove 2324 extending in the circumferential direction of the body segment 2321, and the annular groove 2324 is configured to receive the insulator 235.

The outer peripheral face of the body segment 2321 of the terminal post 232 is provided with an annular groove 2324 configured to receive the insulator 235, so that this structure can function to limit the insulator 235 to some extent so as to reduce a phenomenon of movement of the insulator 235 relative to the body segment 2321, and can also function to position the insulator 235 to some extent so as to facilitate mounting of the insulator 235 during production.

According to some embodiments of the present application, with continued reference to FIGS. 7, 8 and 9, an outer peripheral face of the insulator 235 does not extend beyond the outer peripheral face of the body segment 2321 in a radial direction of the terminal post 232.

The outer peripheral face of the insulator 235 does not extend beyond the outer peripheral face of the body segment 2321, namely, in the radial direction of the terminal post 232, the insulator 235 is completely received in the annular groove 2324.

The outer peripheral face of the insulator 235 is configured to not extend beyond the outer peripheral face of the body segment 2321, so that the insulator 235 can be better protected.

According to some embodiments of the present application, the insulator 235 has a thickness of 0.005 mm-1.5 mm.

By setting the thickness of the insulator 235 from 0.005 mm to 1.5 mm, it is possible to reduce the risk of poor insulating effect due to an excessively small thickness of the insulator 235, and to alleviate a phenomenon in which a space of the terminal post 232 is occupied due to an excessively large thickness of the insulator 235 and thus the current conduction capacity of the terminal post 232 is poor.

According to some embodiments of the present application, the insulator 235 is an insulating film fitted outside the body segment 2321.

The body segment 2321 of the terminal post 232 may be enclosed with the insulating film by means of gluing, hot melting, or other processes.

Illustratively, the insulating film may be made from one or more of polyimide, polyethylene, polyvinylidene fluoride, polytetrafluoroethylene, etc.

According to some embodiments of the present application, the insulator 235 is an insulating layer applied to an outer surface of the body segment 2321.

Illustratively, the insulating layer is an insulating coating formed on the outer peripheral side of the terminal post 232 by means of spraying, and the insulating layer may be made from one or more of an epoxy polyurethane resin, an epoxy phenolic resin, a bisphenol A epoxy resin, etc.

According to some embodiments of the present application, the insulator 235 is an insulating layer formed on the outer surface of the terminal post 232 by means of a physico-chemical reaction.

Illustratively, the insulating layer is an insulating protective layer formed by means of a chemical or physical reaction on the surface of the terminal post 232. For example, when the terminal post 232 is made of an aluminum, the insulating layer is made from an aluminum oxide formed by means of a chemical or physical reaction on the surface of the terminal post 232.

According to some embodiments of the present application, the present application further provides a battery cell 20, including an electrode assembly 21, a housing 22, and the end cap assembly 23 according to any one of the above solutions. The housing 22 has an opening 221, and the housing 22 is configured to receive the electrode assembly 21. The end cap 231 is configured to cover the opening 221, and the terminal post 232 is electrically connected to the electrode assembly 21.

According to some embodiments of the present application, the present application further provides a battery 100, including a case 10 and the battery cell 20 according to any one of the above solutions. The case 10 is configured to receive the battery cell 20.

According to some embodiments of the present application, the present application further provides a power consuming device, including the battery 100 according to any one of the above solutions. The battery 100 is configured to provide electric energy for the power consuming device.

The power consuming device may be any one of the foregoing devices or systems using the battery 100.

According to some embodiments of the present application, with reference to FIGS. 3-9, the present application provides an end cap assembly 23, including the end cap 231, the terminal post 232, the connecting member 238, the first isolator 233, the second isolator 234, the insulator 235, and the seal 239. The end cap 231 has the first side 2312 and the second side 2313, which are opposite to each other, in the thickness direction thereof, the second side 2313 is configured to face the electrode assembly 21, the mounting hole 2311 is formed in the end cap 231, and the mounting hole 2311 penetrates the first side 2312 and the second side 2313 of the end cap 231 in the thickness direction of the end cap 231. The terminal post 232 includes the body segment 2321, and the first connecting segment 2322 and the second connecting segment 2323 that are connected to the two ends of the body segment 2321. The body segment 2321 is arranged in the mounting hole 2311 in a penetrating manner, the two ends of the body segment 2321 respectively extend out of the mounting hole 2311, the annular groove 2324 extending in the circumferential direction of the terminal post 232 is formed in the outer peripheral face of the body segment 2321, the first connecting segment 2322 is located on the first side 2312, and the second connecting segment 2323 is located on the second side 2313. The connecting member 238 is connected to the terminal post 232 and located on the first side 2312 of the end cap 231, and the first connecting segment 2322 is pressed against the connecting member 238 so as to press the connecting member 238 against the first side 2312 of the end cap 231. The first isolator 233 and the second isolator 234 are respectively arranged on the first side 2312 and the second side 2313 of the end cap 231, the first isolator 233 and the second isolator 234 are configured to cooperatively insulate and isolate the terminal post 232 from the end cap 231, the first isolator 233 has the isolation portion 2331 extending into the mounting hole 2311, the isolation portion 2331 is located between the body segment 2321 and the hole wall of the mounting hole 2311, and the gap 236 is formed between the isolation portion 2331 and the second isolator 234 in the thickness direction of the end cap 231. The first isolator 233 is partially located between the connecting member 238 and the end cap 231 in the thickness direction of the end cap 231, and the connecting member 238 has the first abutting face 2381 abutting against the first isolator 233. The second isolator 234 is partially located between the second connecting segment 2323 and the end cap 231 in the thickness direction of the end cap 231, and the second isolator 234 has the second abutting face 2341 against which the second connecting segment 2323 abuts. The insulator 235 encloses the outer peripheral side of the body segment 2321 in the circumferential direction of the body segment 2321, the insulator 235 is received in the annular groove 2324 of the body segment 2321, and the insulator 235 is configured to prevent the body segment 2321 from coming into contact with the conductive medium entering the mounting hole 2311. In the thickness direction of the end cap 231, the insulator 235 has the first end and the second end that are opposite to each other, the first end and the second end respectively extend out of the first side 2312 and the second side 2313 of the end cap 231 from the mounting hole 2311, the first end is farther away from the end cap 231 than the first abutting face 2381, and the second end is farther away from the end cap 231 than the second abutting face 2341. The seal 239 is fitted outside the insulator 235, the seal 239 is located in the mounting hole 2311, and the seal 239 is configured to seal the isolation portion 2331 from the second isolator 234.

Figure 10:
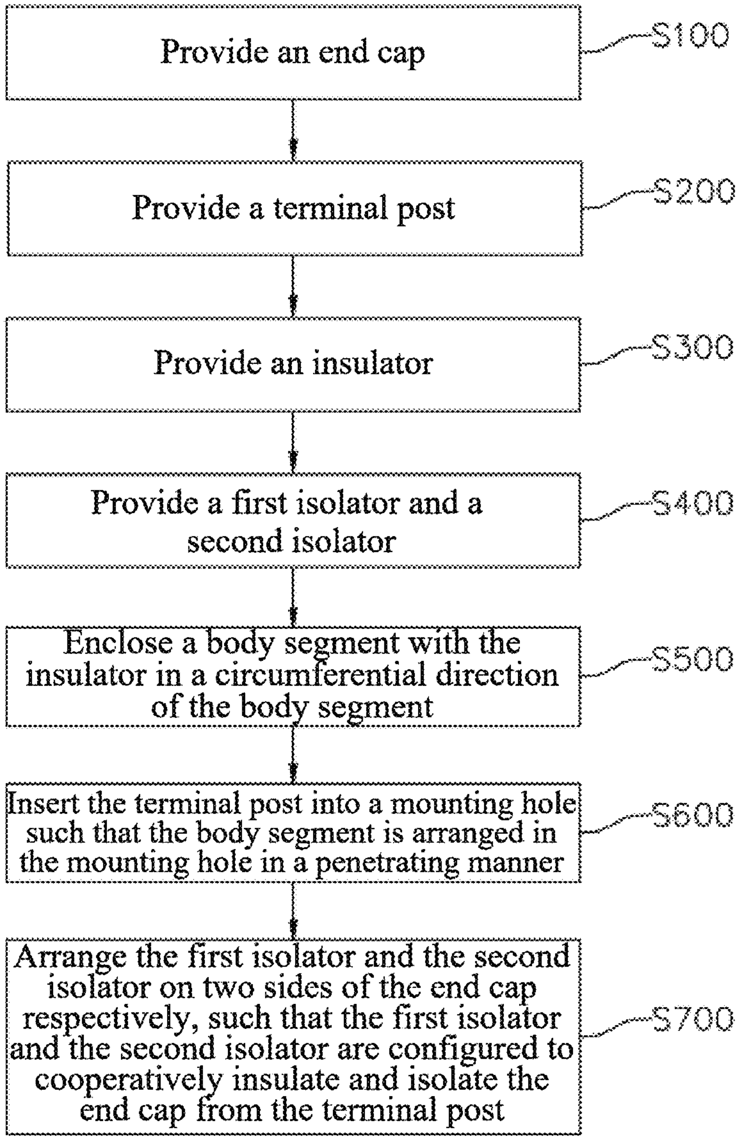
FIG. 10 is a schematic flowchart of a method for manufacturing an end cap assembly according to some embodiments of the present application.

The embodiments of the present application further provide a method for manufacturing the end cap assembly 23. Referring to FIG. 10, FIG. 10 is a schematic flowchart of a method for manufacturing an end cap assembly 23 according to some embodiments of the present application. The manufacturing method includes the flowing steps.

At step S100, an end cap 231 is provided, where the end cap 231 is provided with a mounting hole 2311, and the mounting hole 2311 runs through the end cap 231 in a thickness direction of the end cap 231.

At step S200, a terminal post 232 is provided, where the terminal post 232 includes a body segment 2321.

At step S300, an insulator 235 is provided.

At step S400, a first isolator 233 and a second isolator 234 are provided.

At step S500, the body segment 2321 is enclosed with the insulator 235 in a circumferential direction of the body segment 2321.

At step S600, the terminal post 232 is inserted into the mounting hole 2311 such that the body segment 2321 is arranged in the mounting hole 2311 in a penetrating manner.

At step S700, the first isolator 233 and the second isolator 234 are respectively arranged on two sides of the end cap 231, such that the first isolator 233 and the second isolator 234 are configured to cooperatively insulate and isolate the end cap 231 from the terminal post 232.

In the thickness direction of the end cap 231, the first isolator 233 and the second isolator 234 form a gap 236 at a position opposite the mounting hole 2311, two ends of the insulator 235 both extend beyond the gap 236, and the insulator 235 is configured to prevent the body segment 2321 from coming into contact with the conductive medium entering the mounting hole 2311.

It should be noted that a related structure of the end cap assembly 23 manufactured through the manufacturing method provided in the above embodiments can refer to the end cap assembly 23 provided in the foregoing embodiments, and details are not repeated herein.

Figure 11:
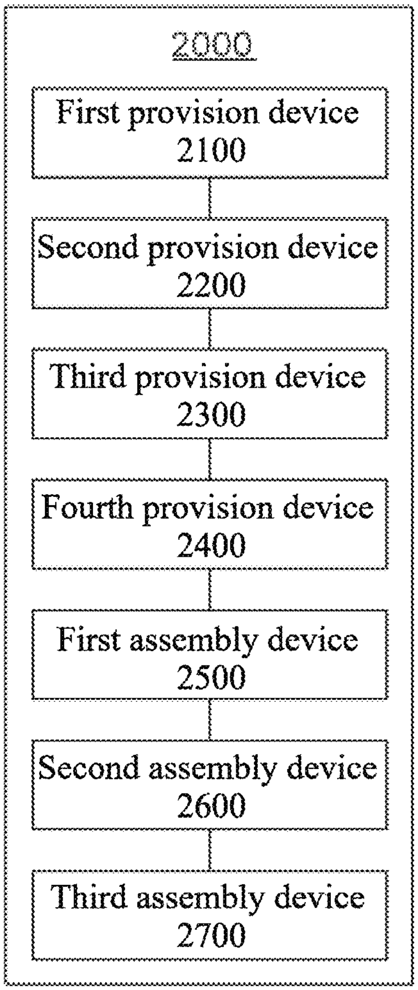
FIG. 11 is a schematic block diagram of a apparatus for manufacturing an end cap assembly according to some embodiments of the present application.

The embodiments of the present application further provide an apparatus 2000 for manufacturing an end cap assembly 23. Referring to FIG. 11, FIG. 11 is a schematic block diagram of the apparatus 2000 for manufacturing an end cap assembly 23 according to some embodiments of the present application. The manufacturing apparatus 2000 includes a first provision device 2100, a second provision device 2200, a third provision device 2300, a fourth provision device 2400, a first assembly device 2500, a second assembly device 2600 and a third assembly device 2700.

The first provision device 2100 is configured to provide an end cap 231, where the end cap 231 is provided with a mounting hole 2311, and the mounting hole 2311 runs through the end cap 231 in a thickness direction of the end cap 231. The second provision device 2200 is configured to provide a terminal post 232, where the terminal post 232 includes a body segment 2321. The third provision device 2300 is configured to provide an insulator 235. The fourth provision device 2400 is configured to provide a first isolator 233 and a second isolator 234. The first assembly device 2500 is configured to enclose the body segment 2321 with the insulator 235 in a circumferential direction of the body segment 2321. The second assembly device 2600 is configured to insert the terminal post 232 into the mounting hole 2311 such that the body segment 2321 is arranged in the mounting hole 2311 in a penetrating manner. The third assembly device 2700 is configured to respectively arrange the first isolator 233 and the second isolator 234 on two sides of the end cap 231, such that the first isolator 233 and the second isolator 234 are configured to cooperatively insulate and isolate the end cap 231 from the terminal post 232.

In the thickness direction of the end cap 231, the first isolator 233 and the second isolator 234 form a gap 236 at a position opposite the mounting hole 2311, two ends of the insulator 235 both extend beyond the gap 236, and the insulator 235 is configured to prevent the body segment 2321 from coming into contact with the conductive medium entering the mounting hole 2311.

It should be noted that a related structure of the end cap assembly 23 manufactured by the manufacturing apparatus 2000 provided in the above embodiments can refer to the end cap assembly 23 provided in the foregoing embodiments, and details are not repeated herein.

It should be noted that the embodiments in the present application and features in the embodiments may be combined with each other without conflicts.

The foregoing descriptions are merely preferred embodiments of the present application, and are not intended to limit the present application. For those skilled in the art, various modifications and variations may be made to the present application. Any modifications, equivalent substitutions, improvements, and the like made within the spirit and principle of the present application should fall within the scope of protection of the present application.

The invention claimed is:

1. An end cap assembly, comprising:

an end cap provided with a mounting hole, the mounting hole running through the end cap in a thickness direction of the end cap;

a terminal post configured to be electrically connected to an electrode assembly, the terminal post comprising a body segment arranged in the mounting hole in a penetrating manner;

a first isolator and a second isolator respectively arranged on two sides of the end cap in the thickness direction of the end cap, the first isolator and the second isolator being configured to cooperatively insulate and isolate the end cap from the terminal post; and an insulator enclosing the body segment in a circumferential direction of the body segment, the insulator being configured to prevent the body segment from coming into contact with a conductive medium entering the mounting hole;

wherein in the thickness direction of the end cap, the first isolator and the second isolator form a gap at a position within the mounting hole, and two ends of the insulator both extend beyond the gap, and the insulator is separated from the end cap by the gap in a radial direction of the terminal post.

2. The end cap assembly according to claim 1, wherein the first isolator is provided with an isolation structure extending into the mounting hole and the isolation structure insulates and isolates the end cap from the body segment; and the isolation structure and the second isolator form the gap in the thickness direction of the end cap.

3. The end cap assembly according to claim 2, wherein the end cap has opposite first and second sides in the thickness direction of the end cap, and the second side is configured to face the electrode assembly;

the end cap assembly further comprises a connector connected to the terminal post and located on the first side, and in the thickness direction of the end cap, at least part of the first isolator is located between the connector and the end cap so as to insulate and isolate the connector from the end cap;

wherein in the thickness direction of the end cap, the connector has a first abutting face to abut against the first isolator, the insulator has a first end extending out of the first side, and the first abutting face is closer to the end cap than the first end.

4. The end cap assembly according to claim 3, wherein the terminal post further comprises:

a first connecting structure connected to the body segment and located on the first side, and the first connecting structure presses the connector against the first isolator.

5. The end cap assembly according to claim 3, wherein the terminal post further comprises:

a second connecting structure connected to the body segment and located on the second side, the second connecting structure electrically connected to the electrode assembly, and in the thickness direction of the end cap, at least part of the second isolator is located between the second connecting structure and the end cap so as to insulate and isolate the second connecting structure from the end cap;

wherein in the thickness direction of the end cap, the second isolator has a second abutting face to abut against the second connecting structure, the insulator has a second end extending out of the second side, and the second abutting face is closer to the end cap than the second end.

6. The end cap assembly according to claim 2, further comprising:

a seal fitted outside the insulator and located in the mounting hole, the seal being configured to seal the isolation structure from the second isolator.

7. The end cap assembly according to claim 1, wherein an outer peripheral face of the body segment is provided with an annular groove extending in the circumferential direction of the body segment, and the annular groove is configured to receive the insulator.

8. The end cap assembly according to claim 7, wherein an outer peripheral face of the insulator does not extend beyond the outer peripheral face of the body segment in a radial direction of the terminal post.

9. The end cap assembly according to claim 1, wherein the insulator has a thickness of 0.005 mm-1.5 mm.

10. The end cap assembly according to claim 1, wherein the insulator is an insulating film fitted outside the body segment.

11. The end cap assembly according to claim 1, wherein the insulator is an insulating layer applied to an outer surface of the body segment.

12. The end cap assembly according to claim 1, wherein the insulator is an insulating layer formed on an outer surface of the terminal post by means of a physico-chemical reaction.

13. A battery cell, comprising:

an electrode assembly;

a housing having an opening and configured to receive the electrode assembly; and an end cap assembly according to claim 1, where the end cap is configured to cover the opening, and the terminal post is electrically connected to the electrode assembly.

14. A battery, comprising:

a battery cell according to claim 13; and a case configured to receive the battery cell.

15. A power consuming device, comprising a battery according to claim 14.

16. A method for manufacturing an end cap assembly, the manufacturing method comprising:

providing an end cap provided with a mounting hole, the mounting hole running through the end cap in a thickness direction of the end cap;

providing a terminal post comprising a body segment;

providing an insulator;

providing a first isolator and a second isolator;

enclosing the body segment with the insulator in a circumferential direction of the body segment;

inserting the terminal post into the mounting hole such that the body segment is arranged in the mounting hole in a penetrating manner;

arranging the first isolator and the second isolator on two sides of the end cap respectively such that the first isolator and the second isolator are configured to cooperatively insulate and isolate the end cap from the terminal post;

wherein the first isolator and the second isolator form a gap at a position within the mounting hole in the thickness direction of the end cap, two ends of the insulator both extend beyond the gap, and the insulator is configured to prevent the body segment from coming into contact with a conductive medium entering the mounting hole, and the insulator is separated from the end cap by the gap in a radial direction of the terminal post.

* * * * *